United States Patent
Kim

(10) Patent No.: US 7,072,069 B2
(45) Date of Patent: Jul. 4, 2006

(54) METHOD FOR EXTENDING PRINT AREA

(75) Inventor: Ihn-kyung Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 872 days.

(21) Appl. No.: 09/844,500

(22) Filed: Apr. 30, 2001

(65) Prior Publication Data

US 2001/0053000 A1    Dec. 20, 2001

(30) Foreign Application Priority Data

Jan. 6, 2000   (KR)  .................................. 2001-834

(51) Int. Cl.
*G06F 15/00*   (2006.01)
(52) U.S. Cl. .................... 358/1.18; 358/1.15; 358/1.12; 355/40; 355/54
(58) Field of Classification Search .............. 358/1.18, 358/1.1, 1.15, 1.12, 296; 347/19–20; 707/525; 355/40, 54; 430/22
See application file for complete search history.

(56) References Cited

U.S. PATENT DOCUMENTS 5,879,841 A * 3/1999 Murayama et al. ........... 430/22
6,480,866 B1 * 11/2002 Mastie ....................... 715/525

* cited by examiner

*Primary Examiner*—Twyler M. Lamb
(74) *Attorney, Agent, or Firm*—Robert E. Bushnell, Esq.

(57) ABSTRACT

A method for extending a print area provides a printer with the capability of printing a larger image by extending the print area during the printing of an image. The method extends the print area by means of a window driver which transmits an image to be printed to a printer according to a print command input. The method includes a first print step of the window driver for transmitting a first portion of the image to be printed on a piece of paper, the first portion being bounded by a lower end margin of the piece of paper, and a second print step of the window driver for transmitting a second portion of the image to be printed on a portion of the piece of paper below the lower end margin of the paper. Accordingly, since the printable area becomes larger by reducing the lower end margin of the printer to the level of the upper end margin, documents created by a user (such as CAD drawings, graphics and charts) are printed without being cut.

17 Claims, 4 Drawing Sheets

METHOD FOR EXTENDING PRINT AREA

CLAIM OF PRIORITY

This application makes reference to, incorporates the same herein, and claims all benefits accruing under 35 U.S.C. §119 from my application A METHOD FOR EXTENDING PRINT AREA filed with the Korean Industrial Property Office on Jan. 6, 2001 and there duly assigned Ser. No. 834/2001.

BACKGROUND OF THE INVENTION

1. Technical Field

The present invention relates to a printing method and, more particularly, to a method for extending a print area, so as to provide the capability of printing an image larger than a conventional print area on a piece of paper by extending the print area during the printing of the image.

2. Related Art

Printers may be classified as impact-type printers or nonimpact-type printers according to whether the head thereof contacts or does not contact a piece of paper. A representative impact-type printer is a dot printer. Representative nonimpact-type printers are a laser printer and an ink jet printer.

In the case of the dot printer, it is not necessary to consider the minimum bottom margin since printing is performed on paper punched on the left and right ends thereof so that a tractor arranged to be parallel to the direction of movement of the head moves the paper. However, additional tractor paper must be used.

In the case of the laser printer, after a drum is covered with toner using a laser beam modulated in accordance with a picture signal, the toner is loaded under high-temperature heat while pressing the drum against the paper. In this case, the bottom margin is small and the printable area is larger than that of an ink jet printer since paper is ejected to a final exit roller after printing is finished.

In the case of the ink jet printer, letters and pictures are outputted by densely forming dots as in the dot printer. However, printing is performed after a piece of paper passes through an exit roller and moves to a head using a method of performing printing in units of lines using an ink head. When the ink jet printer performs printing, the exit roller holds the lower end of a piece of paper to the end thereof and ejects the paper before the set low end margin. Therefore, a large-width lower end margin is necessary. Accordingly, the printable area becomes smaller.

SUMMARY OF THE INVENTION

To solve the above problems, it is an object of the present invention to provide a method for extending a print area so that a printed image is not cut off due to a lower end margin generated by an exit roller.

Accordingly, to achieve the above object, there is provided a method for extending a print area by means of a window driver for transmitting an image to be printed according to a print command input from an external source, and a printer for printing the transmitted image to be printed, the method comprising the steps of: (a) transmitting, in accordance with a first print step of the window driver, an image to be printed on a piece of paper, the image being bounded by the lower end margin of the piece of paper as provided to the printer according to the print command; and (b) transmitting, in accordance with a second print step of the window driver, an image to be printed on a portion of the piece of paper below the lower end margin as provided to the printer. The second print step is executed after printing on the piece of paper in the first print step.

The step (a) comprises the steps of (a-1) the printer determining whether the image to be printed exceeds the lower end margin of a set piece of paper, (a-2) when the image to be printed exceeds the lower end margin, displaying a first image to be printed as far as the lower end margin, and (a-3) transmitting the displayed first image to the printer, and printing the transmitted first image. In the step (a-1), the window driver determines whether the image to be printed exceeds the lower end margin of the set paper from predetermined graphic device interface (GDI) information.

The step (b) comprises the steps of (b-1) outputting a message for changing the position of the printed first image, and (b-2) transmitting the second image to be printed on a portion of the piece of paper below the lower end margin to the printer, and printing the second image below the first image, the position of which is inverted according to the message for changing the position of the printed first image.

BRIEF DESCRIPTION OF THE DRAWING

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, and wherein.

DESCRIPTION OF THE PREFERRED EMBODIMENT(S)

Figure 1:
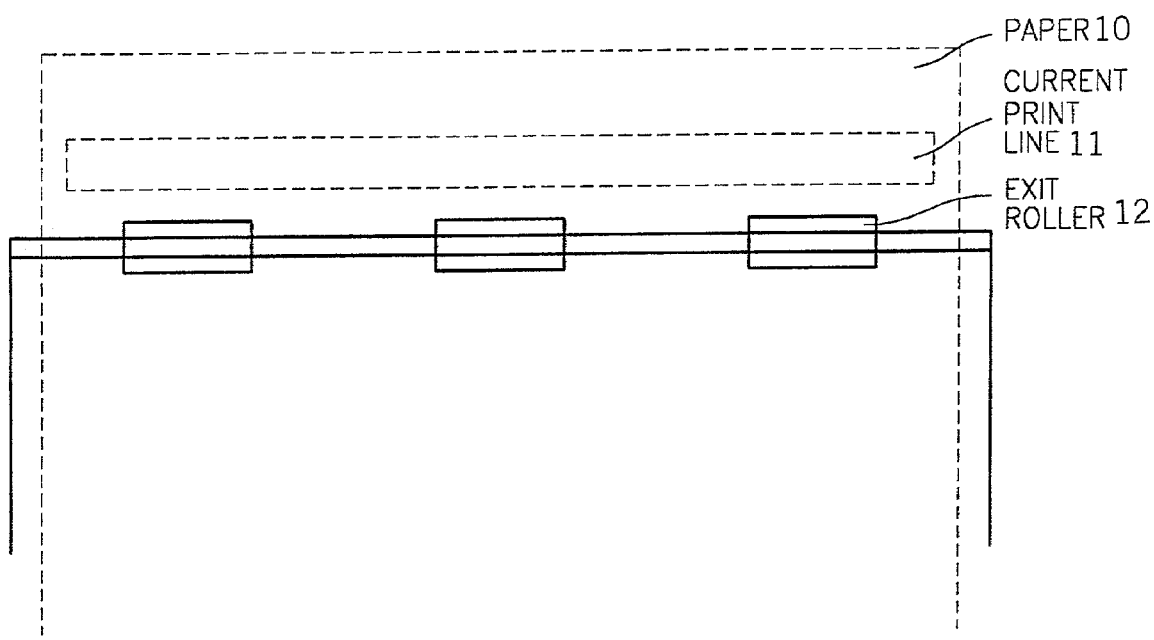
FIG. 1 illustrates a printing method for an ink jet printer.

FIG. 1 illustrates a printing method for an ink jet printer. Referring to FIG. 1, in the case of the ink jet printer, letters and pictures are outputted by densely forming dots. However, printing is performed after a piece of paper 10 passes through an exit roller 12 and moves to a head using a method of performing printing in units of lines using an ink head. When the ink jet printer performs printing of a current print line 11, the exit roller 12 holds the lower end of the piece of paper 10 to the end thereof and ejects the paper 10 before the set low end margin. Therefore, a large-width lower end margin is necessary. Accordingly, the printable area becomes smaller.

Figure 2:
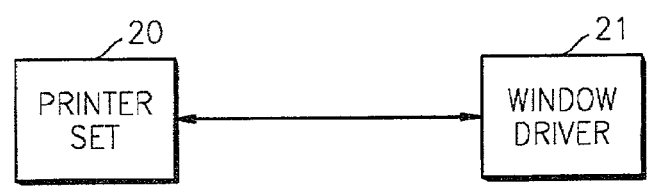
FIG. 2 is a block diagram showing the structure of an apparatus for extending a print area according to an embodiment of the present invention.

FIG. 2 is a block diagram showing the structure of an apparatus for extending a print area according to an embodiment of the present invention. The apparatus for extending the print area includes a printer set 20 for receiving a print image and for performing printing, and a window driver 21 for receiving graphic device interface (GDI) information from an application, for creating the print image, for transmitting the created print image to the printer set 20, and for interfacing with a user.

Figure 3:
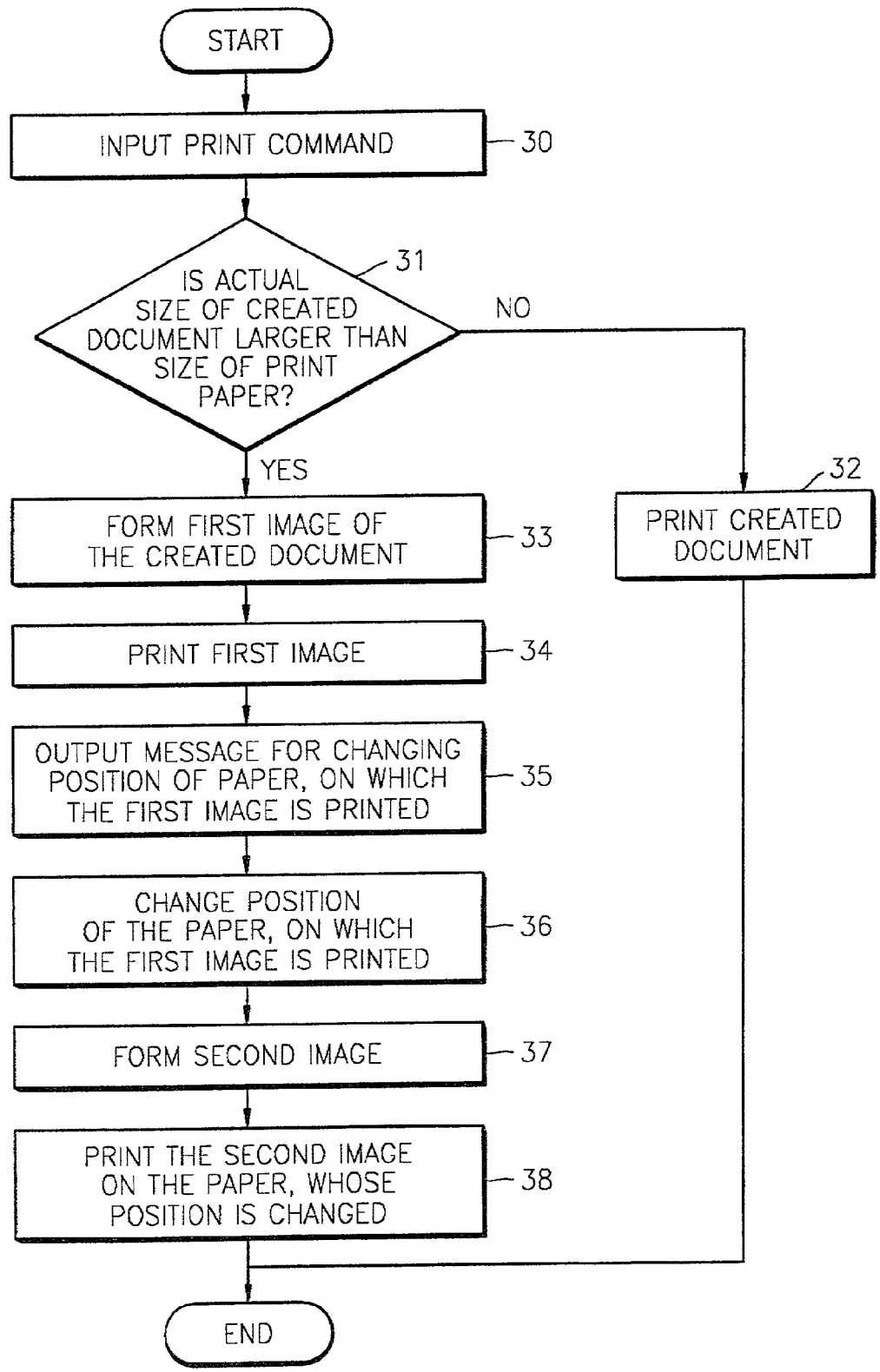
FIG. 3 is a flowchart of a method for extending a print area according to the present invention.

FIG. 3 is a flowchart of a method for extending a print area according to the present invention. The method includes the steps of inputting a print command (step 30), determining whether the actual size of a created document is larger than the size of a print paper (step 31), printing the created document when the size of the created document is not larger than the size of the print paper (step 32), and, when the size of the created document is larger than the size of the print paper, forming a first image of the created document (step 33), printing the first image (step 34), outputting a message for changing the position of the paper on which the first image is printed (step 35), changing the position of the paper on which the first image is printed (step 36), forming a second image of the created document (step 37), and printing the second image on the paper whose position is changed (step 38).

Figure 4A:
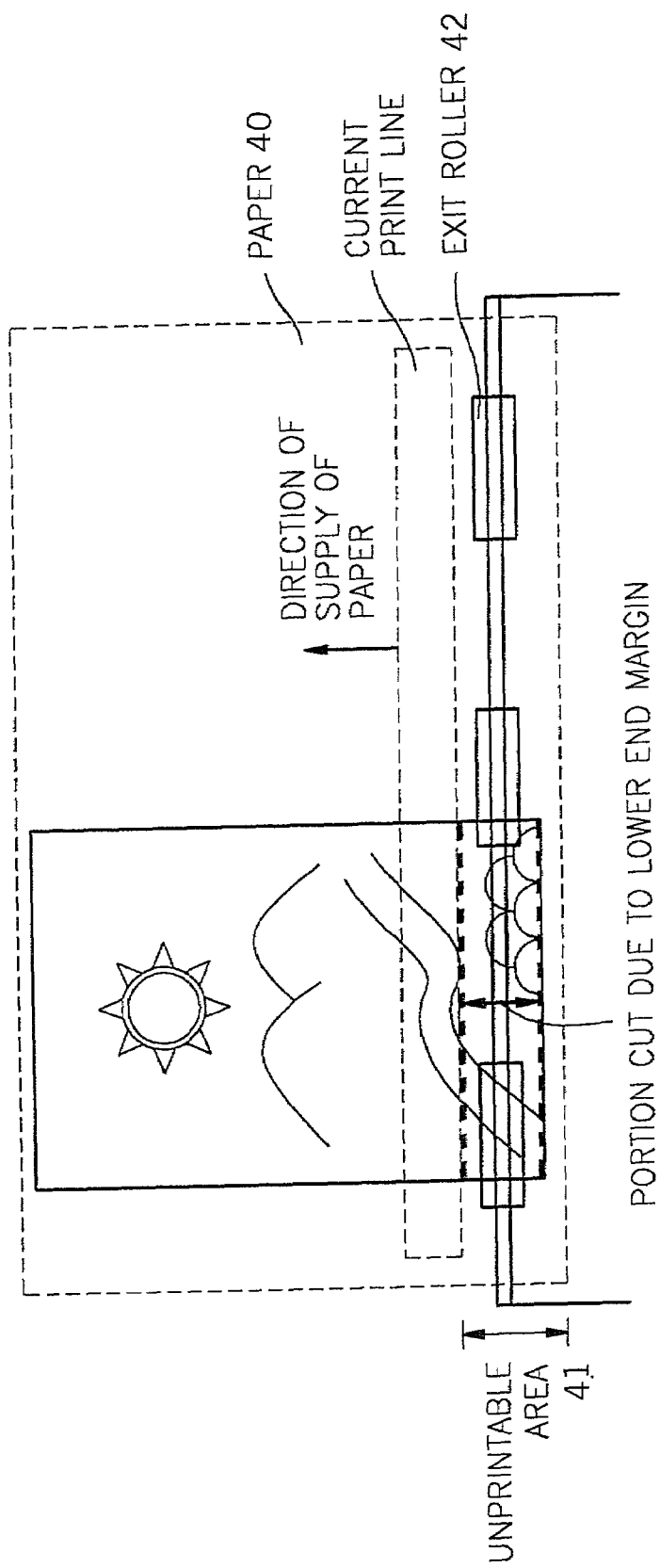
FIGS. 4A and 4B illustrate the print operations of FIG. 3.
Figure 4B:
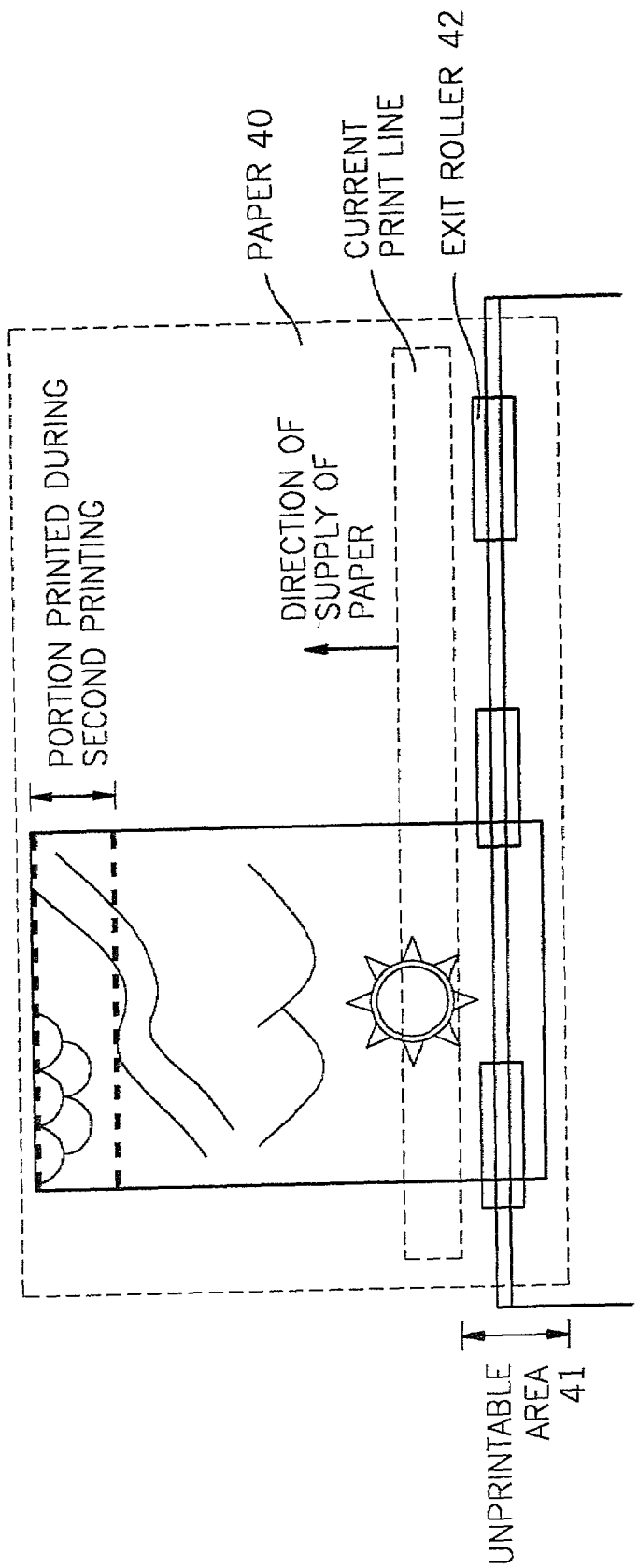

FIGS. 4A and 4B illustrate the print operations of FIG. 3. FIG. 4A illustrates the operation of printing the first image. FIG. 4B illustrates the operation of printing the remaining second image on the paper on which the first image is printed.

The present invention will be described in detail with reference to FIGS. 2, 3, 4A and 4B.

In order to extend the print area according to the present invention, printing is divided into a first print step and a second print step. The first print step includes steps 30 thru 34 of FIG. 3, while the second print step includes steps 35 thru 37 of FIG. 3.

In order to perform the first print step, a user inputs a print command in an application (step 30). The user uses the application on a window driver (for example, a computer, etc.) 21, and inputs the print command in order to print the document created while using the application.

The printer set 20 receives the print command from the user and determines, from GDI information, whether the actual size of the document created by the user is larger than the size of set print paper (step 31).

The term "GDI" refers to the structural element of a window which is in charge of realizing graphic functions, such as drawing lines and managing colors. The GDI provides functions which can be used by application programs, and structures related to the application programs, in order to output graphics on a display from a printer, and from other devices. Straight lines, curved lines, polygons, text, and bit-map images can be realized. The GDI in the printer set 20 refers to technology for generating a printing image by means of the window driver 21, and for outputting the printing image by means of the printer set 20. Since the GDI processes almost all printing work, excluding physical printing, by means of the window driver 21 as software, it is possible to minimize a printer controller and a memory (not shown). Accordingly, it is possible to significantly cut down manufacturing expenses of the printer set 20.

When the actual size of the document created by the user is smaller than the size of the set print paper, the printer set 20 prints the document created by the user (step 32).

When the actual size of the document created by the user is larger than the size of the set print paper, the printer set 20 forms a first image from the document created by the user and displays the first image through the window driver 21 (step 33). That is, if the document created by the user exceeds the lower end margin of the print paper 40 (FIG. 4A), the printer set 20 (FIG. 2) forms the first image excluding the lower end margin (an unprintable area 41) generated by the exit roller 42 (FIG. 4A).

The formed first image is transmitted to the printer set 20 (FIG. 2). The printer set 20 loads the paper 40, prints the first image, and ejects the paper 40 on which the first image is printed (step 34 of FIG. 3).

In order to perform the second print step, a message for changing the position of the paper 40, on which the first image is printed, is outputted (step 35 of FIG. 3). In order to print the lower end margin on the ejected paper 40 on which the first image is printed, the printer set 20 outputs a message, "please load a first print paper (the piece of paper on which the first image is printed) backwards for second printing" as an example.

According to the message for changing the position of the paper 40, the user changes the position of the paper 40 on which the first image is printed (step 36). The user loads the paper 40 on which the first image is printed backwards.

The printer set 20 forms the second image (step 37) and prints the remaining second image on the paper 40 whose position is changed (step 38). When the paper is loaded, the lower end of the first image becomes the upper end of the first image. Therefore, the second image becomes the upper end of the first image, and the lower end margin of the second image, which was not printed, is printed.

As shown in FIG. 4B, since the lower end margin of the paper 40 on which the first image is printed becomes the upper end, printing can be performed on the lower end margin, on which printing was previously not performed due to the exit roller 42. As an example, if the upper end margin is 5 mm and the lower end margin is 150 mm, the lower end margin is reduced by 5 mm from 150 mm to 145 mm when the present invention is applied.

As mentioned above, according to the present invention, since the printable area becomes larger because the lower end margin of the ink jet printer can be reduced to the level of the upper end margin, documents created by a user, such as CAD drawings, graphics and charts, can be printed without being cut off.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A method for extending a print area by means of a window driver for transmitting an image to be printed according to a print command input from an external source, and a printer for printing the transmitted image to be printed, said method comprising the steps of:
   (a) executing a first print step of the window driver by transmitting, to the printer according to the print command input, a first portion of the image, the first portion to be printed on a paper, the first portion being bounded by a lower end margin of the paper; and
   (b) executing a second print step of the window driver by transmitting, to the printer, a second portion of the image, the second portion to be printed on a portion of the paper below the lower end margin.

2. The method of claim 1, wherein the first print step includes printing the first portion on the paper, and wherein the second print step is executed after the printing of the first portion on the paper in the first print step.

3. The method of claim 1, wherein step (a) comprises the steps of:
   (a-1) determining, whether the image to be printed by the printer exceeds the lower end margin of a set paper;
   (a-2) when the image to be printed exceeds the lower end margin of the set paper, forming a first image to be printed as far as the lower end margin; and
   (a-3) transmitting the formed first image to the printer, and printing the transmitted formed first image.

4. The method of claim 3, wherein, in step (a-1), the printer determines whether the image to be printed exceeds the lower end margin of the paper from predetermined graphic device interface (GDI) information.

5. The method of claim 1, wherein, in step (b) comprises the steps of:
(b-1) outputting a message for changing a position of the paper on which the first portion is printed; and
(b-2) transmitting, to the printer, the second portion of the image to be printed on the portion of the paper below the lower end margin, and printing the second portion below the first portion on the paper, a position of which is inverted according to the message for changing the position of the paper on which the first portion is printed.

6. A method for extending a print area for an image to be printed by a printer on a paper according to a print command input, said method comprising the steps of:
(a) transmitting, to the printer, a first portion of the image, the first portion to be printed by the printer on the paper, the first portion being bounded by a lower end margin of the paper; and
(b) transmitting, to the printer, a second portion of the image, the second portion to be printed on a portion of the paper below the lower end margin.

7. The method of claim 6, wherein step (a) includes printing the first portion on the paper, and wherein step (b) is executed after printing of the first portion on the paper is carried out in step (a).

8. The method of claim 6, wherein step (a) comprises the steps of:
(a-1) determining whether the image to be printed exceeds the lower end margin of the paper;
(a-2) when the image to be printed exceeds the lower end margin of the paper, forming a first image corresponding to the first portion, the first image to be printed as far as the lower end margin; and
(a-3) transmitting the formed first image to the printer for printing as far as the lower end margin.

9. The method of claim 8, wherein step (a-1) is carried out by the printer using predetermined graphic device interface (GDI) information.

10. The method of claim 6, wherein step (b) comprises the steps of:
(b-1) outputting a message for changing a position of the paper on which the first portion is printed; and
(b-2) transmitting, to the printer, the second portion to be printed on the portion of the paper below the lower end margin, and printing the second portion below the first portion on the paper, a position of which is inverted according to the message for changing the position of the paper on which the first portion is printed.

11. A method for extending a print area for a document to be printed by a printer according to a print command input, said method comprising the steps of:
(a) receiving the print command input;
(b) determining whether an actual size of the document to be printed exceeds a size of the print area on a paper on which the document is to be printed;
(c) when the actual size of the document to be printed does not exceed the size of the print area on the paper on which the document is to be printed, printing the document on the paper; and
(d) when the actual size of the document to be printed does exceed the size of the print area on the paper on which the document is to be printed, forming a first image corresponding to a portion of the document to be printed up to a lower end margin of the paper, forming a second image corresponding to another portion of the document to be printed below the first image and within the lower end margin of the paper, and printing the first and second images in sequence on the paper.

12. The method of claim 11, wherein a position of the paper in the printer is changed by a user between the printing of the first image and the printing of the second image.

13. The method of claim 12, wherein the paper is inverted in the printer by the user between the printing of the first image and the printing of the second image.

14. The method of claim 13, wherein a message calling for the user to invert the paper in the printer is generated after the printing of the first image.

15. The method of claim 12, wherein a message calling for the user to change the position of the paper in the printer is generated after the printing of the first image.

16. The method of claim 11, wherein a message calling for a user to change a position of the paper in the printer is generated between the printing of the first image and the printing of the second image.

17. The method of claim 16, wherein the paper is inverted in the printer by the user between the printing of the first image and the printing of the second image in response to the generated message.

* * * * *